(12) United States Patent
Nishijima et al.

(10) Patent No.: US 12,159,463 B2
(45) Date of Patent: Dec. 3, 2024

(54) TARGET VEHICLE RECOGNITION APPARATUS AND PROCESSING METHOD OF TARGET VEHICLE RECOGNITION APPARATUS

(71) Applicant: TOYOTA JIDOSHA KABUSHIKI KAISHA, Toyota Aichi-ken (JP)

(72) Inventors: Masakazu Nishijima, Ebina Kanagawa (JP); Wataru Sasagawa, Susono Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 17/948,628

(22) Filed: Sep. 20, 2022

(65) Prior Publication Data

US 2023/0102842 A1    Mar. 30, 2023

(30) Foreign Application Priority Data

Sep. 27, 2021  (JP) .................................. 2021-156437

(51) Int. Cl.
  *G06V 20/00*  (2022.01)
  *B60W 60/00*  (2020.01)
  *G06V 20/56*  (2022.01)

(52) U.S. Cl.
  CPC .......... *G06V 20/56* (2022.01); *B60W 60/001* (2020.02); *B60W 2420/403* (2013.01); *B60W 2554/20* (2020.02)

(58) Field of Classification Search
  CPC ...... G06V 20/56; G06V 20/588; G06V 20/58; B60W 60/001; B60W 2420/403; B60W 2554/20; B60W 30/08; B60W 30/0956; B60W 2554/801
  See application file for complete search history.

(56) References Cited

U.S. PATENT DOCUMENTS

| 9,405,727 B2 | 8/2016 | Nagata |
| 9,669,760 B2 | 6/2017 | Hanita et al. |
| 9,898,929 B2 | 2/2018 | Harada et al. |
| 11,175,673 B2 | 11/2021 | Eshima |

(Continued)

FOREIGN PATENT DOCUMENTS

| JP | 2005028992 A | * 2/2005 | ........... B60R 21/013 |
| JP | 2005326963 A | * 11/2005 | |

(Continued)

*Primary Examiner* — Peter D Nolan
*Assistant Examiner* — Peter Y Ning
(74) *Attorney, Agent, or Firm* — Dinsmore & Shohl LLP

(57) ABSTRACT

A target vehicle recognition apparatus detects a stopped vehicle ahead of the host vehicle, detects a reference boundary line position where at least one of two boundary lines forming a travel lane of the host vehicle intersects a reference axis extending from a lower end of the stopped vehicle in an image horizontal direction on a captured image, recognizes the stopped vehicle as a target vehicle of steering control when the reference boundary line position between a vehicle left end position of the stopped vehicle and a vehicle right end position of the stopped vehicle is present, and does not recognize the stopped vehicle as a target vehicle of steering control when the reference boundary line position between the vehicle left end position of the stopped vehicle and the vehicle right end position of the stopped vehicle is not present.

5 Claims, 6 Drawing Sheets

(56) References Cited

U.S. PATENT DOCUMENTS

| | | | | |
|---|---|---|---|---|
| 11,945,468 | B2* | 4/2024 | Lee | B60W 30/0956 |
| 2013/0226445 | A1* | 8/2013 | Nagata | G06F 17/00 |
| | | | | 701/300 |
| 2016/0042645 | A1* | 2/2016 | Harada | B60W 30/0956 |
| | | | | 701/117 |
| 2016/0167580 | A1* | 6/2016 | Hanita | G01S 17/93 |
| | | | | 701/301 |
| 2017/0341647 | A1* | 11/2017 | Rajvanshi | B60W 60/00274 |
| 2019/0146516 | A1* | 5/2019 | Eshima | G08G 1/143 |
| | | | | 701/23 |
| 2020/0207341 | A1* | 7/2020 | Inoue | B60W 30/18145 |
| 2020/0231146 | A1* | 7/2020 | Miyano | B60W 30/09 |
| 2021/0061350 | A1* | 3/2021 | Kinoshita | B60W 10/18 |
| 2021/0284141 | A1* | 9/2021 | Sugaya | B60W 10/20 |
| 2021/0284237 | A1* | 9/2021 | Miyano | B62D 15/0265 |
| 2021/0291820 | A1* | 9/2021 | Inoue | B60W 10/04 |

FOREIGN PATENT DOCUMENTS

| | | | | | |
|---|---|---|---|---|---|
| JP | 2008132867 | A | * | 6/2008 | |
| JP | 2010023606 | A | * | 2/2010 | |
| JP | 2010195271 | A | * | 9/2010 | |
| JP | 2019142428 | A | * | 8/2019 | |
| JP | 2019-524525 | A | | 9/2019 | |
| JP | 2020-114690 | A | | 7/2020 | |
| WO | WO-2016051885 | A1 | * | 4/2016 | B60R 1/00 |
| WO | WO-2017110703 | A1 | * | 6/2017 | B60W 30/08 |
| WO | WO-2017199529 | A1 | * | 11/2017 | B60Q 9/008 |
| WO | WO-2018005441 | A2 | * | 1/2018 | B60W 30/08 |

* cited by examiner

TARGET VEHICLE RECOGNITION APPARATUS AND PROCESSING METHOD OF TARGET VEHICLE RECOGNITION APPARATUS

CROSS-REFERENCE TO RELATED APPLICATION

This application claims the benefit of priority from Japanese Patent Application No. 2021-156437, filed Sep. 27, 2021, the entire contents of which are incorporated herein by reference.

TECHNICAL FIELD

The present disclosure relates to a target vehicle recognition apparatus and a processing method of target vehicle recognition apparatus.

BACKGROUND

In the related art, Japanese Unexamined Patent Application Publication No. 2019-524525 is known as a technical document relating to a target vehicle recognition apparatus for recognizing a target vehicle to be avoided by a vehicle steering control. This publication shows that the steering control of a host vehicle is performed so as to pass the side of a parked vehicle at a distance from the parked vehicle in consideration of the possibility that pedestrians may dart out from behind the parked vehicle that is parked outside the travel lane of the vehicle.

SUMMARY

A method is necessary for accurately recognizing a target vehicle for steering control because a host vehicle performs unnecessary steering control when erroneously recognizing another vehicle that is momentarily stopped in an adjacent lane as the target vehicle for steering control.

One aspect of the present disclosure is a target vehicle recognition apparatus for recognizing a target vehicle to be avoided by steering control of a host vehicle. The target vehicle recognition apparatus includes: a stopped vehicle detection unit configured to detect a stopped vehicle located in front of a host vehicle based on at least one of a captured image of a front camera of the host vehicle and a detection result of a front radar sensor of the host vehicle; and an image position detection unit configured to detect a reference axis, a vehicle left end position, a vehicle right end position, and a reference boundary line position on the captured image based on the detection result of the stopped vehicle by the stopped vehicle detection unit and the captured image of the front camera of the host vehicle. The reference axis is a line extending in the image horizontal direction from the lower end of the stopped vehicle on the captured image. The vehicle left end position is a position obtained by projecting the left end of the stopped vehicle on the captured image on the reference axis. The vehicle right end position is a position obtained by projecting the right end of the stopped vehicle on the captured image on the reference axis. The reference boundary line position is a position at which at least one of two boundary lines forming a travel lane of the host vehicle on the captured image intersects the reference axis. In addition, the target vehicle recognition apparatus includes a target vehicle recognition unit that recognizes the stopped vehicle as a target vehicle for the steering control when a reference boundary line position between a left end position of the stopped vehicle and a right end position of the vehicle is present. The target vehicle recognition unit does not recognize the stopped vehicle as the target vehicle for the steering control when there is no reference boundary line position between the left end position of the stopped vehicle and the right end position of the vehicle.

According to the target vehicle recognition apparatus according to an aspect of the present disclosure, a stopped vehicle is recognized as a target vehicle for steering control when a reference boundary line position sandwiched between a vehicle left end position and a vehicle right end position is present in a captured image, in cases where the stopped vehicle is detected in front of a host vehicle. Since the target vehicle recognition apparatus does not recognize the stopped vehicle as the target vehicle for the steering control when the reference boundary line position sandwiched between the vehicle left end position and the vehicle right end position is not present, it is possible to avoid erroneously recognizing the other vehicle while momentarily stopped in the adjacent lane as the target vehicle, and to appropriately recognize the target vehicle to be avoided by the steering control from the captured image.

In the target vehicle recognition apparatus according to an aspect of the present disclosure, the image position detection unit may detect, as the reference boundary line position, a position at which a boundary line closer to the stopped vehicle among two boundary lines forming a travel lane of the host vehicle intersects with the reference axis.

In the target vehicle recognition apparatus according to an aspect of the present disclosure, the image position detection unit may calculate a first distance that is a distance from a position on a host vehicle side of a left end position and a right end position of the stopped vehicle to a reference boundary line position, and a second distance that is a distance from a position on an opposite side of the host vehicle of the left end position and the right end position of the stopped vehicle to the reference boundary line position.

In the target vehicle recognition apparatus according to an aspect of the present disclosure, the image position detection unit may detect, as the reference boundary line position, a first reference boundary line position which is a position where one boundary line of two boundary lines forming a travel lane of the host vehicle and the reference axis intersect, and a second reference boundary line position which is a position where the other boundary line and the reference axis intersect. The target vehicle recognition unit may not recognize the stopped vehicle as the target vehicle for the steering control when a gap lateral distance between a position of a host vehicle side among the vehicle left end position and the vehicle right end position and a reference boundary line position not sandwiched between the vehicle left end position and the vehicle right end position among the first reference boundary line position and the second reference boundary line position is less than a gap lateral distance threshold even when the reference boundary line position sandwiched between the vehicle left end position and the vehicle right end position exists.

Another aspect of the present disclosure is a processing method of target vehicle recognition apparatus for recognizing a target vehicle to be avoided by steering control of a host vehicle. The processing method of target vehicle recognition apparatus includes: a stopped vehicle detection step of detecting a stopped vehicle located in front of a host vehicle based on at least one of a captured image of a front camera of the host vehicle and a detection result of a front radar sensor of the host vehicle; and an image position detection step of detecting a reference axis, a vehicle left end position, a vehicle right end position, and a reference boundary line position on the captured image based on the detection result of the stopped vehicle in the stopped vehicle detection step and the captured image of the front camera of the host vehicle. The reference axis is a line extending in the image horizontal direction from the lower end of the stopped vehicle on the captured image. The vehicle left end position is a position obtained by projecting the left end of the stopped vehicle on the captured image on the reference axis. The vehicle right end position is a position obtained by projecting the right end of the stopped vehicle on the captured image on the reference axis. The reference boundary line position is a position at which at least one of two boundary lines forming a travel lane of the host vehicle on the captured image intersects the reference axis. In addition, the processing method of target vehicle recognition apparatus may include a target vehicle recognition step of recognizing the stopped vehicle as a target vehicle for the steering control when a reference boundary line position sandwiched between a left end position of the stopped vehicle and a right end position of the vehicle is present. In the target vehicle recognition step, if there is no reference boundary line position located between the left end position of the stopped vehicle and the right end position of the vehicle, the stopped vehicle is not recognized as the target vehicle for the steering control.

According to the processing method of target vehicle recognition apparatus according to another aspect of the present disclosure, in a case where a stopped vehicle is detected in front of a host vehicle, when a reference boundary line position sandwiched between a vehicle left end position and a vehicle right end position exists in a captured image, the stopped vehicle is recognized as a target vehicle for the steering control. In the processing method of target vehicle recognition apparatus, since the stopped vehicle is not recognized as the target vehicle for the steering control when the reference boundary line position sandwiched between the vehicle right end position and the vehicle right end position does not exist, it is possible to avoid erroneously recognizing another vehicle during the momentary stop in the adjacent lane as the target vehicle, and to appropriately recognize the target vehicle to be avoided by the steering control from the captured image.

According to each aspect of the present disclosure, it is possible to appropriately recognize a target vehicle which is an avoidance target for the steering control from a captured image.

DETAILED DESCRIPTION

Hereinafter, embodiments of the present disclosure will be described with reference to the drawings.

Figure 1:
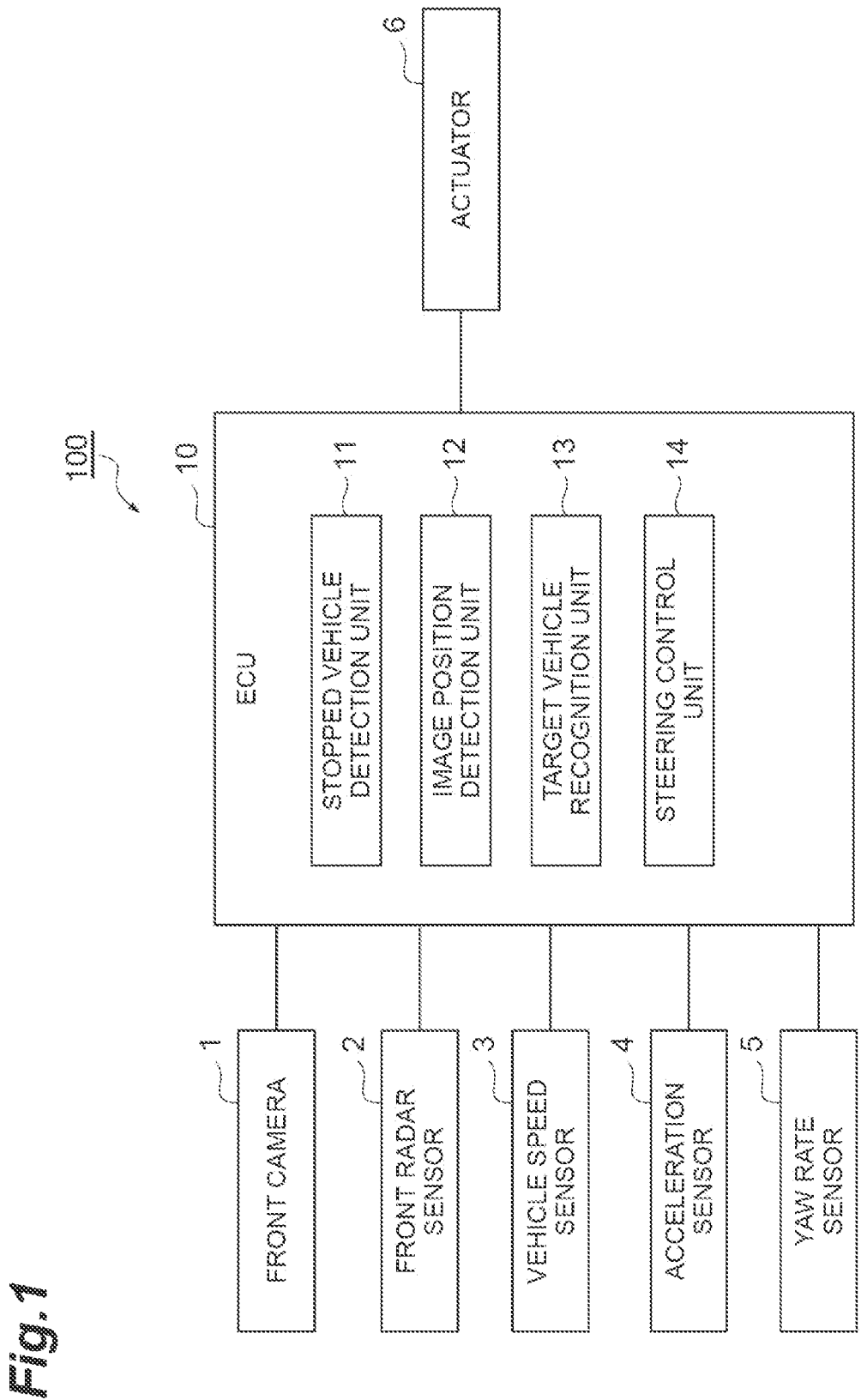
FIG. 1 is a block diagram illustrating a steering control apparatus (target vehicle recognition apparatus) according to an embodiment.

As illustrated in FIG. 1, a steering control apparatus 100 (target vehicle recognition apparatus) according to an embodiment is a device that is mounted in a vehicle such as a passenger car and performs steering control of the vehicle. Hereinafter, the vehicles equipped with the steering control apparatus 100 are referred to as a host vehicle. The host vehicle may be an autonomous driving vehicle.

The steering control means, as an example, control of steering in a PDA [Proactive Driving Assist]. The steering control includes control for avoiding an object to be avoided by steering the host vehicle. The steering control controls steering of the host vehicle such that the host vehicle passes by the side of the vehicle while keeping a distance from the vehicle as an object to be avoided, the vehicle being stopped or parked while protruding into the travel lane of the host vehicle.

Figure 2:
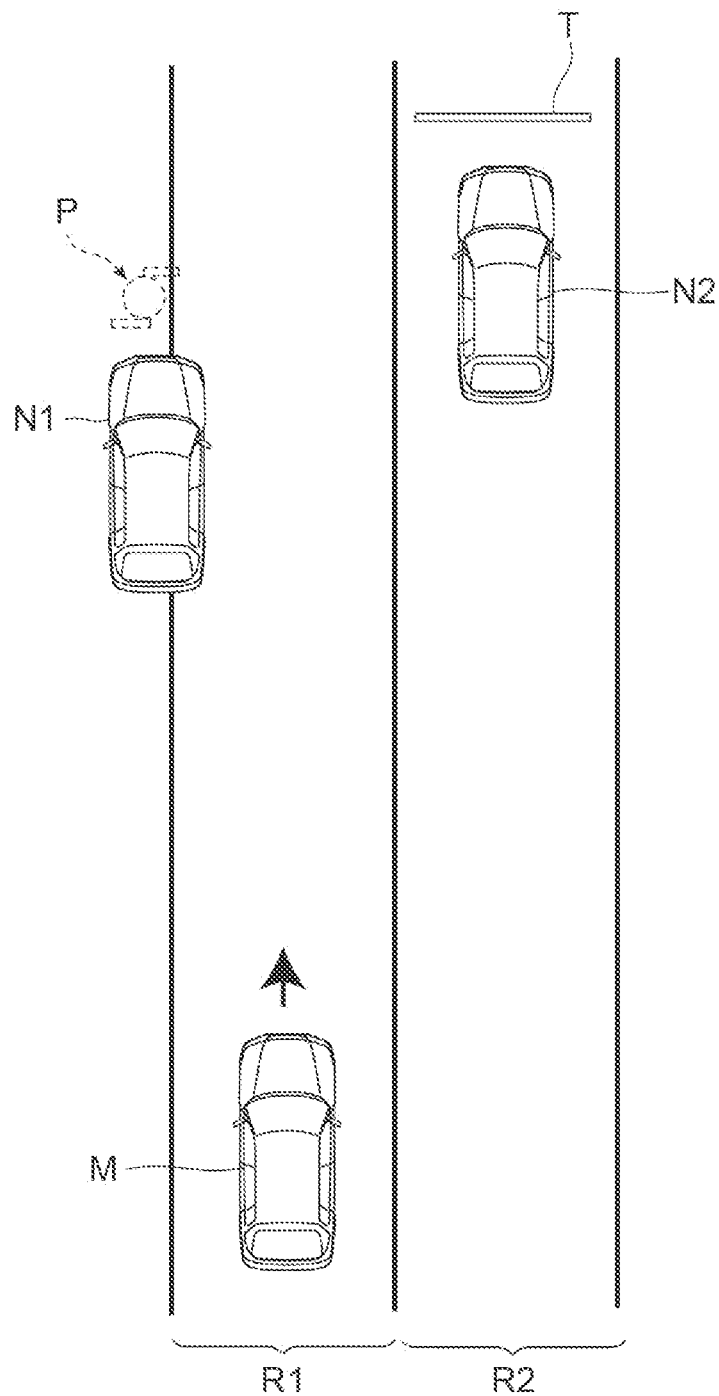
FIG. 2 is a plan view illustrating an example of a situation in which a stopped vehicle is present.

The steering control apparatus 100 recognizes a target vehicle which is an object of avoidance of steering control. FIG. 2 is a plan view illustrating an example of the target vehicle. FIG. 2 shows a travel lane R1 in which a host vehicle M and the host vehicle M travel, an adjacent lane R2 adjacent to the travel lane R1, a stop line T of the adjacent lane R2, and a stopped vehicle N1 and a stopped vehicle N2 which are other vehicles stopped in front of the host vehicle M.

The stopped vehicle N1 are vehicles that are stopped while protruding from the travel lane R1. The stopped vehicle N1 may be a parked car. For example, the stopped vehicle N1 rides on a sidewalk beside the travel lane R1 and stops. In the situation shown in FIG. 2, there is a possibility that a pedestrian P jumps out from the front side of the stopped vehicle N1, which is a blind spot of the host vehicle M. The stopped vehicle N2 are vehicles that are at a momentary stop before the stop line T on the adjacent lane R2. The steering control apparatus 100 according to the present embodiment does not recognize the stopped vehicle N2 on the adjacent lane R2 as the target vehicle while performing steering control to pass the side by using the stopped vehicle N1 as the target vehicle.

Configuration of Steering Control Apparatus

The steering control apparatus 100 is provided with an ECU 10 (Electronic Control Unit) manages the apparatus. The ECU 10 is an electronic control unit including a central processing unit (CPU) and a storage unit such as a read only memory (ROM) or a random-access memory (RAM). In the ECU 10, for example, various functions are realized by executing a program stored in the storage unit by the CPU. The ECU 10 may be composed of a plurality of electronic units. In addition, some of the functions of the ECU 10 described below may be executed in servers capable of communicating with the host vehicle.

A front camera 1, a front radar sensor 2, a vehicle speed sensor 3, an acceleration sensor 4, a yaw rate sensor 5, and actuators 6 are connected to the ECU 10. The front camera 1 is a camera for capturing an image in front of the host vehicle. The front camera 1 is provided on the back side of the windshield of the host vehicle, for example, and transmits the captured image in front of the host vehicle to the ECU 10. The front camera 1 may be a monocular camera or may be a stereo camera.

The front radar sensor 2 is a detection device that detects an object in front of the host vehicle using radio waves (for example, millimeter waves) or light. The front radar sensor 2 includes, for example, a millimeter wave radar or a light detection and ranging [LIDAR]. The front radar sensor 2 detects an object by transmitting radio waves or light to the periphery of the host vehicle and receiving radio waves or light reflected by the object. The front radar sensor 2 transmits information on the detected object such as the preceding vehicle to the ECU 10. The detection result of the front radar sensor 2 also includes speed information of the object (for example, a relative speed with a host vehicle).

The vehicle speed sensor 3 is a detector that detects the speed of the host vehicle. As the vehicle speed sensor 3, for example, a wheel speed sensor that is provided on a wheel of a host vehicle or a drive shaft that rotates integrally with the wheel and detects the rotation speed of the wheel is used. The vehicle speed sensor 3 transmits the detected vehicle speed information (wheel speed information) to the ECU 10.

The acceleration sensor 4 is a detector that detects accelerations of the host vehicle. The acceleration sensor 4 includes, for example, a longitudinal acceleration sensor that detects longitudinal accelerations of the host vehicle, and a lateral acceleration sensor that detects lateral accelerations of the host vehicle. The acceleration sensor 4 transmits, for example, acceleration information of the host vehicle to the ECU 10.

The yaw rate sensor 5 is a detector that detects the yaw rate (rotational angular speed) of the vertical axis of the center of gravity of the host vehicle. As the yaw rate sensor 5, for example, a gyro sensor can be used. The yaw rate sensor 5 transmits yaw rate information of the detected host vehicle to the ECU 10.

The actuator 6 is a device used for controlling the host vehicle. The actuator 6 includes at least a drive actuator, a brake actuator, and a steering actuator. The drive actuator controls the amount of air supplied to the engine (throttle opening) in accordance with a control signal from the ECU 10, and controls the driving force of the host vehicle. When the host vehicle is a hybrid electric vehicle (HEV), a control signal from the ECU 10 is input to a motor as a power source in addition to the amount of air supplied to the engine, and the driving force is controlled. When the host vehicle is a battery electric vehicle (BEV), a control signal from the ECU 10 is input to a motor as a power source, and the driving force is controlled. The motor as a power source in these cases constitutes the actuator 6.

The brake actuator controls a brake system in response to a control signal from the ECU 10, and controls a braking force applied to wheels of the host vehicle. As the brake system, for example, a hydraulic brake system can be used. The steering actuator controls driving of an assist motor for controlling steering torque in an electric power steering system according to a control signal from the ECU 10. Accordingly, the steering actuator controls the steering torque of the host vehicle.

Next, the functional configuration of the ECU 10 will be described. ECU 10 has a stopped vehicle detection unit 11, an image position detection unit 12, a target vehicle recognition unit 13, and a steering control unit 14. Note that some of the functions of the ECU 10 described below may be executed by servers capable of communicating with the host vehicle.

The stopped vehicle detection unit 11 may detect a stopped vehicle located in front of the host vehicle based on at least one of a captured image of the front camera 1 and a detection result of the front radar sensor 2. The stopped vehicle is a vehicle having a speed of "0". The vehicle is not limited to a four wheeled vehicle and may be a two wheeled vehicle. A method of detecting the stopped vehicle is not particularly limited, and a known method can be adopted. The stopped vehicle detection unit 11 may detect that the vehicle is a stopped vehicle from a speed difference between other vehicles in front of the host vehicle and a guardrail or other structure in front of the host vehicle, for example. The stopped vehicle detection unit 11 may detect the stopped vehicle based on the vehicle speed detected by the vehicle speed sensor 3 of the host vehicle.

The image position detection unit 12 detects various positions on the captured image based on the detection result of the stopped vehicle by the stopped vehicle detection unit 11 and the captured image of the front camera 1 of the host vehicle. In detail, the image position detection unit 12 detects a reference axis which is an axial line extending from the lower end of the stopped vehicle in the image horizontal direction on the captured image, a vehicle left end position obtained by projecting the left end of the stopped vehicle on the captured image on the reference axis, a vehicle right end position obtained by projecting the right end of the stopped vehicle on the captured image on the reference axis, and a reference boundary line position which is a position where at least one of two boundary lines forming the travel lane R1 of the host vehicle intersects the reference axis on the captured image.

The image position detection unit 12 detects various positions by recognizing a travel lane R1 line of a stopped vehicle or a boundary unit on a captured image through deep learning or pattern matching, for example. The image position detection unit 12 may employ other well-known image processing methods.

Figure 3:
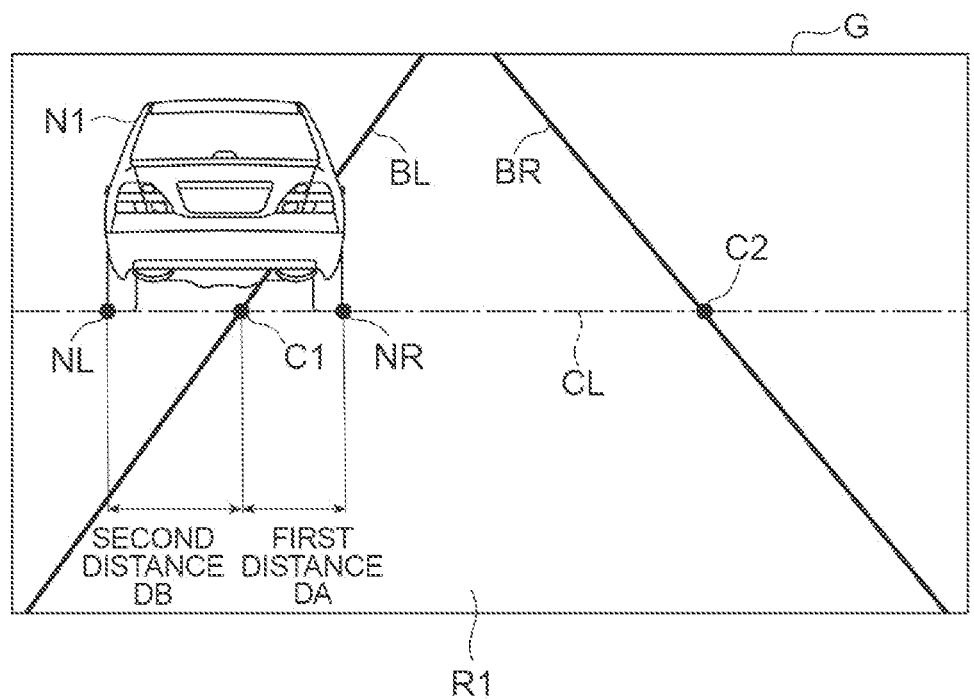
FIG. 3 is a diagram for explaining various types of position detection on a captured image.

Here, FIG. 3 is a diagram for explaining various types of position detection on the captured image. FIG. 3 shows a captured image G in front of the host vehicle M, the travel lane R1 in the captured image G, two a boundary line BL forming the travel lane R1, the stopped vehicle N1 in the captured image G, a reference axis CL, vehicle left end position NL, a vehicle right end position NR, a first reference boundary line position C1, a second reference boundary line position C2, a first distance DA, and a second distance DB.

As shown in FIG. 3, the reference axis CL is an axial line extending in the image horizontal direction from the lower end of the stopped vehicle N1 on the captured image G. The image horizontal direction is a horizontal direction in the captured image G. The lower end of the stopped vehicle N1 is, for example, the lower end of the tire of the stopped vehicle N1 on the captured image G.

The vehicle left end position NL is a position obtained by projecting the left end of the stopped vehicle N1 on the captured image G onto the reference axis CL. The vehicle right end position NR is a position obtained by projecting the right end of the stopped vehicle N1 on the captured image G onto the reference axis CL. The left end of the stopped vehicle N1 is a portion located at the leftmost end of the stopped vehicle N1. It may be the leftmost protruding portion of the vehicle body of the stopped vehicle N1, or may be the leftmost protruding portion of the loading platform when the stopped vehicle N1 is a cargo vehicle. When the left mirror of the stopped vehicle N1 protrudes to the leftmost side, the tip end of the left mirror may be set as the left end. A position obtained by vertically projecting the left end of the stopped vehicle N1 with respect to the reference axis CL is the vehicle left end position NL. Since the vehicle right end position NR is the same as the vehicle left end position NL, description thereof will be omitted.

The first reference boundary line position C1 is a position where a boundary line BL and the reference axis CL forming the travel lane R1 of the host vehicle on the captured image G intersect. The second reference boundary line position C2 is a position where a boundary line BR and the reference axis CL intersect. When the boundary line BL is composed of a plurality of pixels in the image horizontal direction (when the boundary line BL has a certain size on the captured image G), the first reference boundary line position C1 may be the position of the center of the boundary line BL in the image horizontal direction, or may be the position of the edge of the host vehicle side or the edge opposite to the host vehicle side in the image horizontal direction of the boundary line BL.

The first distance DA is the distance from the host vehicle side position, from between the vehicle left end position NL and the vehicle right end position NR, to the first reference boundary line position C1 on the reference axis CL. The second distance DB is a distance from a position on the opposite side of the host vehicle to the first reference boundary line position C1, from between the vehicle left end position NL and the vehicle right end position NR, on the reference axis CL. The first distance DA in FIG. 3 is a distance between the first reference boundary line position C1 and the vehicle right end position NR. The second distance DB in FIG. 3 is a distance between the vehicle left end position NL and the first reference boundary line position C1. The image position detection unit 12 may calculate a first distance and a second distance that correspond to the second reference boundary line position C2.

The image position detection unit 12 does not necessarily have to detect the first reference boundary line position C1 of the boundary line BL and the second reference boundary line position C2 of the boundary line BR. The image position detection unit 12 may detect only the first reference boundary line position C1 corresponding to the boundary line BL close to the stopped vehicle N1 among the boundary line BL and the BRs.

The target vehicle recognition unit 13 determines whether or not there is a reference the image position detection unit 12 line position (the first reference boundary line position C1 or the second reference boundary line position C2) sandwiched between the vehicle left end position NL of the stopped vehicle N1 and the vehicle right end position NR based on the detection result of the boundary unit.

The target vehicle recognition unit 13 may determine the horizontal coordinates (coordinates in the image horizontal direction) of each position at the pixel level by Semantic Segmentation. For example, when the pixel coordinates of the vehicle left end position NL are subtracted from the pixel coordinates of the first reference boundary line position C1, the difference becomes a negative value when the vehicle left end position NL is located on the left side of the first reference boundary line position C1. When the vehicle left end position NL is located on the right side of the first reference boundary line position C1, the difference is a positive value.

Similarly, when the pixel coordinates of the vehicle right end position NR are subtracted from the pixel coordinates of the first reference boundary line position C1, the difference becomes a negative value when the vehicle right end position NR is located on the left side of the first reference boundary line position C1. When the vehicle right end position NR is located on the right side of the first reference boundary line position C1, the difference is a positive value. When the sign of the difference between the vehicle left end position NL and the vehicle right end position NR is different, the target vehicle recognition unit 13 determines that there is the first reference boundary line position C1 sandwiched between the vehicle left end position NL of the stopped vehicle N1 and the vehicle right end position NR.

The second reference boundary line position C2 can in the same manner. In the situation shown in FIG. 3, the target vehicle recognition unit 13 determines that the second reference boundary line position C2 is not sandwiched between the vehicle left end position NL and the vehicle right end position NR because the sign of the difference between the second reference boundary line position C2 and the vehicle left end position NL is the same as the sign of the difference between the second reference boundary line position C2 and the vehicle right end position NR. Note that the method of obtaining the image coordinates of each position is not limited to Semantic Segmentation, and a known method can be employed.

When it is determined that there is the first reference boundary line position C1 between the vehicle left end position NL of the stopped vehicle N1 and the vehicle right end position NR, the target vehicle recognition unit 13 determines whether the first distance DA between the first reference boundary line position C1 and the vehicle right end position NR is unit and the unit, is larger than the second distance DB, which is the interval between the vehicle left end position NL and the reference boundary line position C1. The first distance DA corresponds to the difference between the vehicle right end position NR and the first reference boundary line position C1 described above, and the second distance DB corresponds to the difference between the vehicle left end position NL and the first reference boundary line position C1 described above.

When it is determined that the first distance DA is larger than the second distance DB, the target vehicle recognition unit 13 does not recognize the stopped vehicle N1 as the target vehicle for the steering control. When it is not determined that the first distance DA is larger than the second distance DB, the target vehicle recognition unit 13 recognizes the stopped vehicle N1 as the target vehicle for the steering control.

When the target vehicle to be avoided by the steering control is recognized by the target vehicle recognition unit 13, the steering control unit 14 executes the steering control for avoiding the target vehicle and passing by the side of the target vehicle. The steering control unit 14 performs the steering control based on the vehicle speed, the accelerations, and the yaw rate of the host vehicle based on the captured image of the front camera 1 and/or the detection result of the front radar sensor 2. Note that the steering control unit 14 does not necessarily perform the steering control even when the target vehicle is recognized.

Processing Method of Steering Control Apparatus

Figure 4:
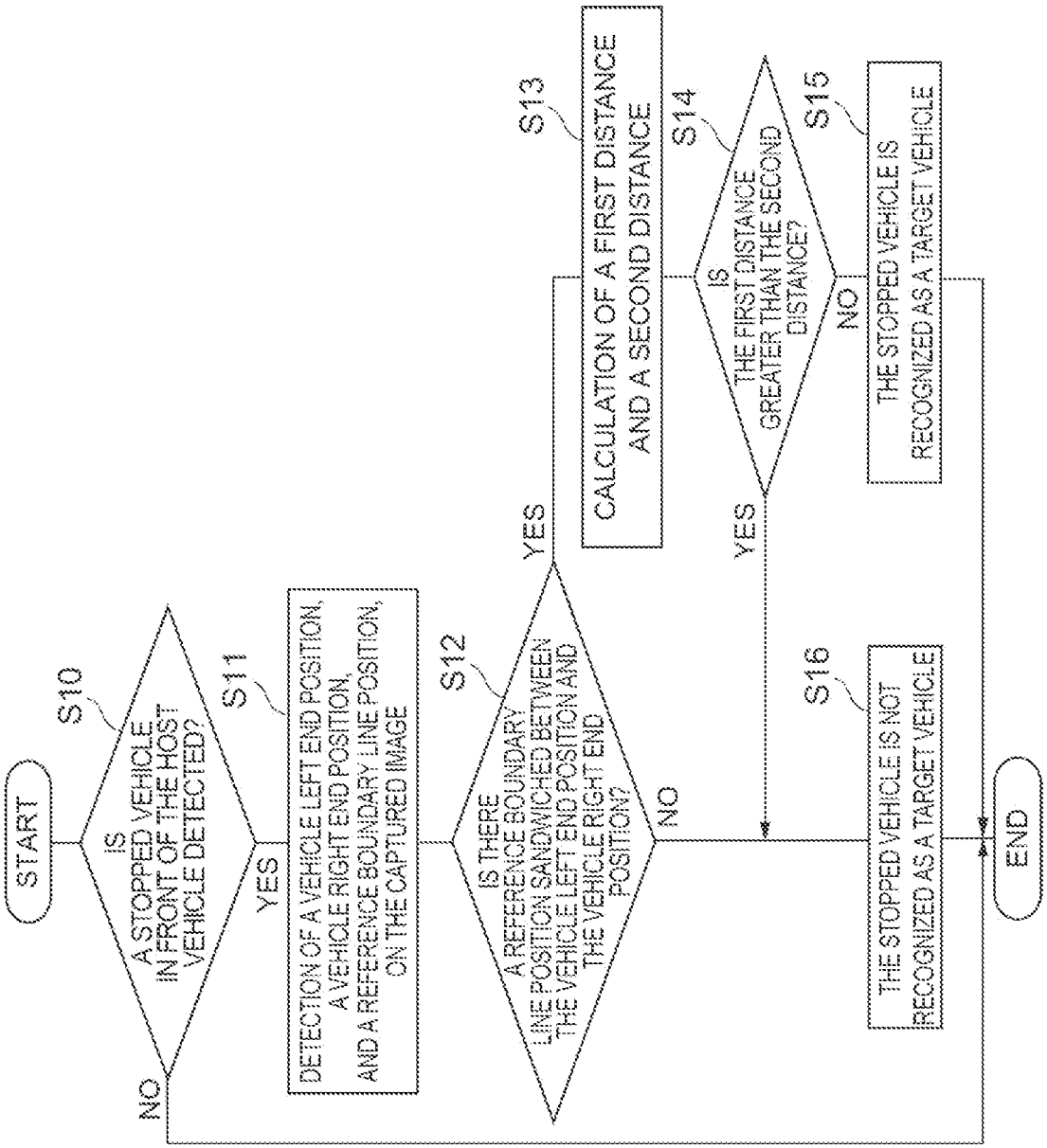
FIG. 4 is a flowchart illustrating an example of the target vehicle recognition processing.

Next, a processing method of the steering control apparatus 100 according to the present embodiment will be described. FIG. 4 is a flowchart illustrating an example of the target vehicle recognition processing. The target vehicle recognition processing is performed, for example, in a case where the setting of execution necessity of steering control of the host vehicle by the driver is set to be necessary.

As shown in FIG. 4, the ECU 10 of the steering control apparatus 100 detects the stopped vehicle N1 located in front of the host vehicle by the stopped vehicle detection unit 11 as S10. S10 is a stopped vehicle detection step. The stopped vehicle detection unit 11 detects the stopped vehicle N1 based on at least one of the captured images of the front camera 1 and the detection result of the front radar sensor 2.

In S11, the ECU 10 detects the vehicle left end position NL, the vehicle right end position NR, and a reference boundary line position (the first reference boundary line position C1 and/or the second reference boundary line position C2) by the image position detection unit 12. S11 is an image position detection step. The image position detection unit 12 detects various positions by recognizing a travel lane R1 line of a stopped vehicle or a boundary unit on a captured image through deep learning or pattern matching, for example.

In S12, the ECU 10 determines whether or not there is a reference boundary line position sandwiched between the vehicle left end position NL of the stopped vehicle N1 and the vehicle right end position NR by the target vehicle recognition unit 13. S12 is a reference boundary line position determination step. The target vehicle recognition unit 13 performs the determination based on the detection result of the image position detection unit 12. When it is determined that there is a reference a stopped vehicle N1 line position sandwiched between the vehicle left end position NL of the boundary unit and the vehicle right end position NR (YES in S12), the ECU 10 transitions to S13. If it is not determined that there is a reference the stopped vehicle N1 line position sandwiched between the vehicle left end position NL of the boundary unit and the vehicle right end position NR (NO in S12), the ECU 10 transitions to S16.

In S13, the ECU 10 calculates a first distance DA and a second distance DB by the image position detection unit 12. S13 is a distance calculation step. The image position detection unit 12 calculates, for a reference boundary line position sandwiched between the vehicle left end position NL and the vehicle right end position NR, the first distance DA which is a range from the position on the host vehicle side of the vehicle left end position NL and the vehicle right end position NR to the reference boundary line position and the second distance DB which is a range from the position on the side opposite to the host vehicle of the vehicle left end position NL and the vehicle right end position NR to the reference boundary line position. The calculation of the first distance DA and the second distance DB may be already performed in S11.

In S14, the ECU 10 determines whether the first distance DA are larger than the second distance DB by the target vehicle recognition unit 13. S14 is a distance determination step. If the ECU 10 is not determined to have the first distance DA greater than the second distance DB (NO in S14), the patient transitions to S15. When it is determined that the first distance DA is larger than the second distance DB (YES in S14), the ECU 10 transitions to S16.

In S15, ECU 10 recognizes the stopped vehicle N1 as a target vehicle of steering control by the target vehicle recognition unit 13. Thereafter, the ECU 10 ends the current processing for the stopped vehicle N1.

In S16, ECU 10 does not recognize the stopped vehicle N1 as the target vehicle for the steering control by the target vehicle recognition unit 13. S15 and S16 are target vehicle recognition steps. Thereafter, the ECU 10 ends the current processing for the stopped vehicle N1.

According to the steering control apparatus 100 of the present embodiment described above, when the stopped vehicle N1 is detected in front of the host vehicle, the stopped vehicle N1 is recognized as the target vehicle for the steering control when the reference boundary line position (the first reference boundary line position C1 and/or the second reference boundary line position C2) sandwiched between the vehicle left end position NL and the vehicle right end position NR is present in the captured image G. As the steering control apparatus 100 does not recognize the stopped vehicle as the target vehicle for the steering control when the reference boundary line position sandwiched between the vehicle left end position NL and the vehicle right end position NR is not present, it is possible to avoid erroneously recognizing other vehicles (the stopped vehicle N2 in FIG. 2) momentarily stopped in the adjacent lane as the target vehicle, and to appropriately recognize the target vehicle to be avoided by the steering control from the captured image G.

Further, according to the steering control apparatus 100, even when the reference boundary line position is sandwiched between the vehicle left end position NL of the stopped vehicle N1 and the vehicle right end position NR, the stopped vehicle N1 is not recognized as the target vehicle for the steering control when the first distance DA of the host vehicle side is larger than the second distance DB on the reference axis CL. When most of the stopped vehicle N1 is located on the travel lane R1 of the host vehicle, there is a high possibility that the vehicle preceding the host vehicle is momentarily stopped. It is thus possible, according to the steering control apparatus 100, to avoid erroneously setting the momentarily stopped vehicle preceding the host vehicle as the avoidance target of the steering control.

In the steering control apparatus 100, when the position where the boundary line closer to the stopped vehicle N1, of the two boundary lines BL and BR, forming the travel lane R1 of the host vehicle intersects the reference axis CL is detected as the reference boundary line position, the reference boundary line position corresponding to the boundary line closer to the stopped vehicle is detected. In which case, there is a high possibility that the stopped vehicle is stopped or parked straddling the boundary line close to the stopped vehicle, from between the two boundary lines forming the travel lane of the host vehicle. According to the steering control apparatus 100, it is thus possible to suppress a calculation processing amount of target vehicle recognition compared to when reference boundary line positions of two boundary lines are both detected.

Embodiment of Modification

Next, a modification of the steering control apparatus 100 will be described. The steering control apparatus 100 recognizes the target vehicle by using the gap lateral distance on the side of the stopped vehicle when there is a reference boundary line position sandwiched between the vehicle left end position NL and the vehicle right end position NR. This is different from the above-described embodiment. The gap lateral distance DS is the distance between the position of the host vehicle side, from between the vehicle left end position NL and the vehicle right end position NR, and the reference boundary line position, from between the first reference boundary line position C1 and the second reference boundary line position C2, which is not sandwiched between the vehicle left end position NL and the vehicle right end position NR.

Figure 5:
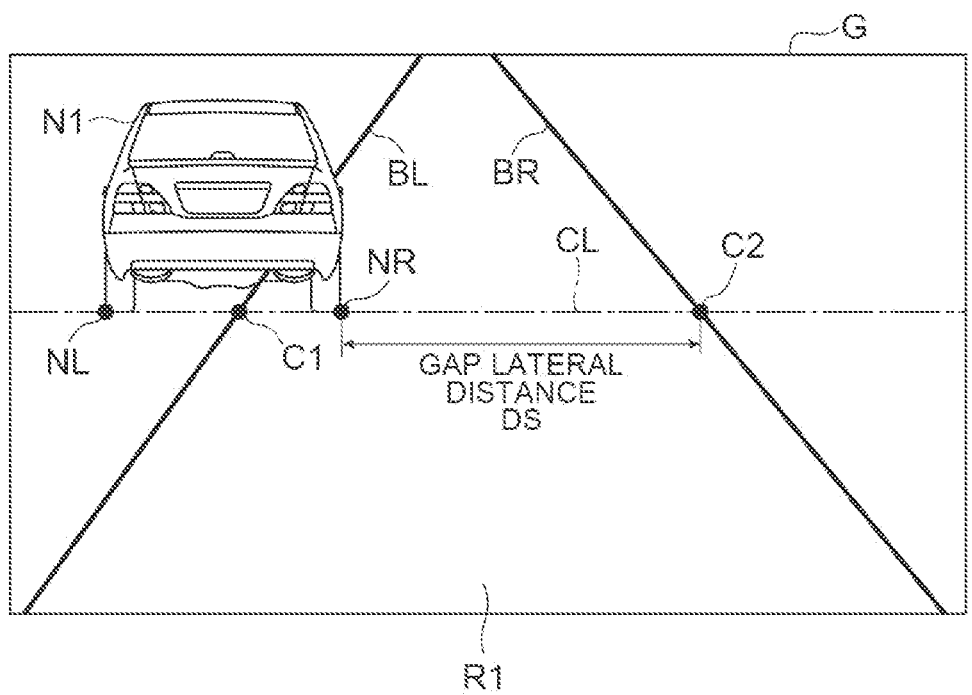
FIG. 5 is a diagram for explaining recognition of a target vehicle on a captured image according to a modification.

FIG. 5 is a diagram for explaining recognition of a target vehicle on a captured image according to a modification. FIG. 5 shows the gap lateral distance DS. The gap lateral distance DS in FIG. 5 is a length between the vehicle right end position NR and the second reference boundary line position C2. The image position detection unit 12 calculates the gap lateral distance DS, which is the difference between the vehicle right end position NR and the second reference boundary line position C2 on the captured image G.

The target vehicle recognition unit 13 does not recognize the stopped vehicle N1 as the target vehicle when the gap lateral distance DS is less than the gap lateral distance threshold even when the reference boundary line position sandwiched between the vehicle left end position NL of the stopped vehicle N1 and the vehicle right end position NR is determined to exist. Gap lateral distance threshold is a threshold value of a preset value. The gap lateral distance threshold is set as a threshold of a value larger than the vehicle width of the host vehicle, for example.

Figure 6:
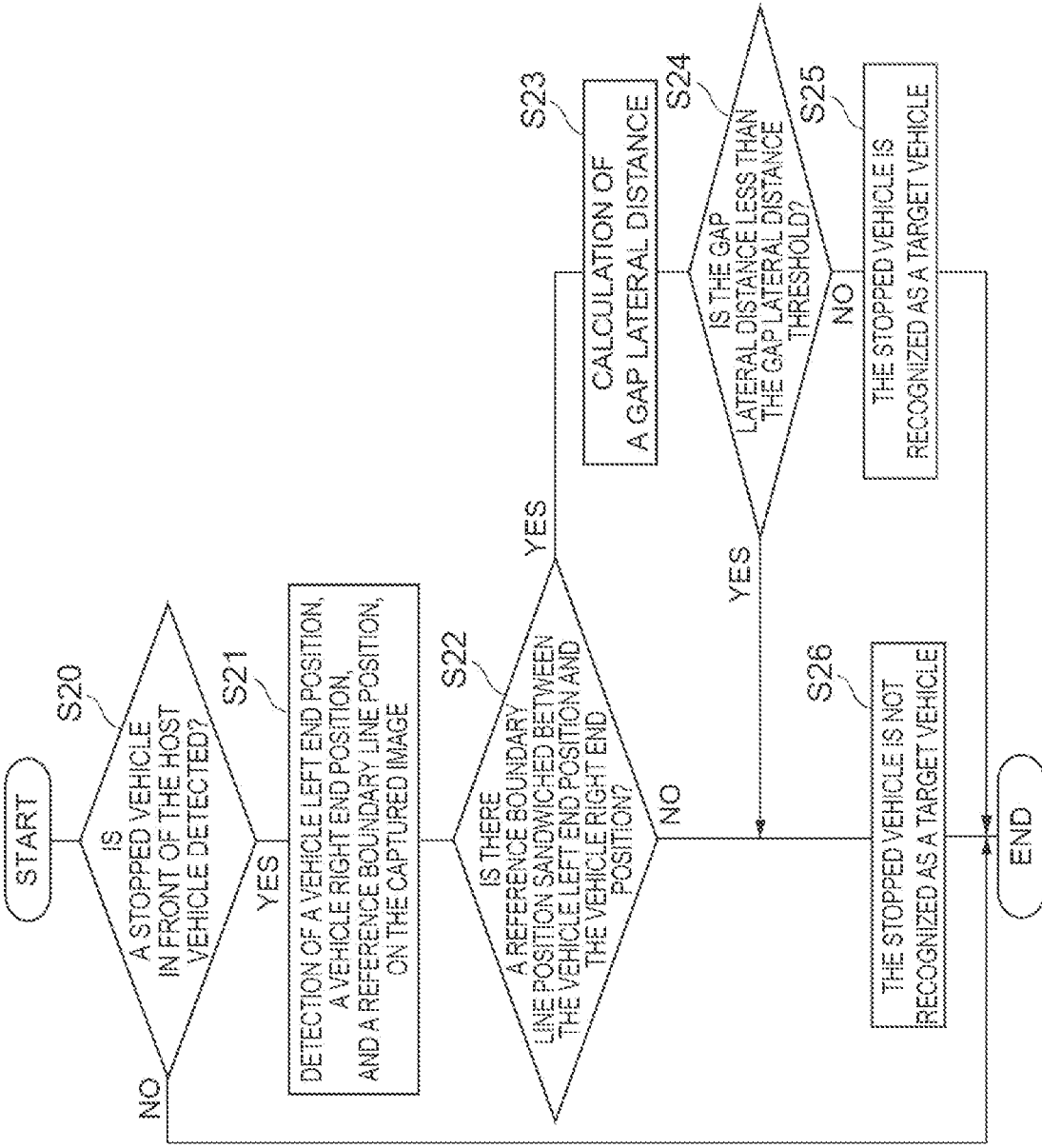
FIG. 6 is a flowchart illustrating an example of target vehicle recognition processing according to a modification.

FIG. 6 is a flowchart illustrating an example of target vehicle recognition processing according to a modification. As shown in FIG. 6, the ECU 10 of the steering control apparatus 100 detects the stopped vehicle N1 located in front of the host vehicle by the stopped vehicle detection unit 11 as S20. S20 is a stopped vehicle detection step. The stopped vehicle detection unit 11 detects the stopped vehicle N1 based on at least one of the captured images of the front camera 1 and the detection result of the front radar sensor 2.

In S21, the ECU 10 detects the vehicle left end position NL, the vehicle right end position NR, and a reference boundary line position (the first reference boundary line position C1 and the second reference boundary line position C2) by the image position detection unit 12. S21 is an image position detection step. The image position detection unit 12 detects various positions by recognizing a travel lane R1 line of a stopped vehicle or a boundary unit on a captured image through deep learning or pattern matching, for example.

In S22, the ECU 10 determines whether or not there is a reference boundary line position sandwiched between the vehicle left end position NL of the stopped vehicle N1 and the vehicle right end position NR by the target vehicle recognition unit 13. S22 is a reference boundary line position determination step. The target vehicle recognition unit 13 performs the determination based on the detection result of the image position detection unit 12. When it is determined that there is the reference the stopped vehicle N1 line position sandwiched between the vehicle left end position NL of the boundary unit and the vehicle right end position NR (YES in S22), the ECU 10 transitions to S23. If it is not determined that there is the reference the stopped vehicle N1 line position sandwiched between the vehicle left end position NL of the boundary unit and the vehicle right end position NR (NO in S22), the ECU 10 transitions to S26.

In S23, ECU 10 calculates the gap lateral distance DS by the image position detection unit 12. S23 is a gap lateral distance calculation step. The image position detection unit 12 calculates the gap lateral distance DS as the distance between the position of host vehicle side in the vehicle left end position NL and the vehicle right end position NR and the reference boundary line position not sandwiched between the vehicle left end position NL and the vehicle right end position NR in the first reference boundary line position C1 and the second reference boundary line position C2. Note that the calculation of the gap lateral distance DS may have already been performed for S21.

In S24, the ECU 10 determines whether the gap lateral distance DS are less than the gap lateral distance threshold by the target vehicle recognition unit 13. S24 is a gap lateral distance determination step. The ECU 10 transitions to S25 if the gap lateral distance DS is not determined to be less than the gap lateral distance threshold (NO in S24). The ECU 10 transitions to S26 if the gap lateral distance DS is determined to be less than the gap lateral distance threshold (YES in S24).

In S25, ECU 10 recognizes the stopped vehicle N1 as a target vehicle for the steering control by the target vehicle recognition unit 13. Thereafter, the ECU 10 ends the current processing for the stopped vehicle N1.

In S26, ECU 10 does not recognize the stopped vehicle N1 as the target vehicle for the steering control by the target vehicle recognition unit 13. S25 and S26 are target vehicle recognition steps. Thereafter, the ECU 10 ends the current processing for the stopped vehicle N1.

According to the steering control apparatus 100 of the modified example described above, since the stopped vehicle is not recognized as the target vehicle for the steering control when the gap lateral distance of the stopped vehicle N1 in the travel lane R1 is less than the gap lateral distance threshold, it is possible to avoid performing the steering control on the stopped vehicle even when it is difficult for the host vehicle to pass by the side of the stopped vehicle.

Although the embodiments of the present disclosure have been described above, the present disclosure is not limited to the above-described embodiments. The present disclosure can be implemented in various forms in which various modifications and improvements are made based on the knowledge of those skilled in the art, including the above-described embodiments.

The target vehicle recognition apparatus according to the present disclosure need not necessarily be integral with the steering control apparatus. The target vehicle recognition apparatus may be separate from the steering control apparatus, and some of its functions may be performed by a server capable of communicating with the host vehicle. The host vehicle in such a case need not be a vehicle on which all components of the target vehicle recognition apparatus are mounted, and means a vehicle that performs steering control.

In the steering control apparatus 100 according to the embodiment, determination using the gap lateral distance DS may be performed as in the modification. That is, when it is not determined that the first distance DA is greater than the second distance DB in S14 of FIG. 4, the steering control apparatus 100 may determine whether the gap lateral distance DS is less than the gap lateral distance threshold as in S24 of FIG. 6. Even if it is not determined that the first distance DA is greater than the second distance DB, when the gap lateral distance DS is less than the gap lateral distance threshold, the steering control apparatus 100 does not recognize the stopped vehicle N1 as the target vehicle for the steering control because it is difficult for the host vehicle to pass by the side of the stopped vehicle N1.

What is claimed is:

1. A target vehicle recognition apparatus for recognizing a target vehicle to be avoided by steering control of a host vehicle, the apparatus comprising:
   an electronic control unit configured to:
   detect a stopped vehicle located in front of the host vehicle based on at least one of a captured image of a front camera of the host vehicle and a detection result of a front radar sensor of the host vehicle;
   detect, based on a detection result of the stopped vehicle by the electronic control unit and a captured image of a front camera of the host vehicle, a reference axis extending in an image horizontal direction from a lower end of the stopped vehicle on the captured image, a vehicle left end position obtained by projecting a left end of the stopped vehicle on the reference axis on the captured image, a vehicle right end position obtained by projecting a right end of the stopped vehicle on the reference axis on the captured image, and a reference boundary line position obtained by intersecting at least one of two boundary lines forming a travel lane of the host vehicle on the captured image and the reference axis; and
   recognize the stopped vehicle as the target vehicle for the steering control when the reference boundary line position sandwiched between the vehicle left end position and the vehicle right end position of the stopped vehicle is present, and not recognize the stopped vehicle as the target vehicle for the steering control when the reference boundary line position sandwiched between the vehicle left end position and the vehicle right end position of the stopped vehicle is not present, wherein the electronic control unit calculates a first distance from a position on the host vehicle side, from between the vehicle left end position and the vehicle right end position of the stopped vehicle, to the reference boundary line position, and a second distance from a position on an opposite side of the host vehicle, from between the vehicle left end position and the vehicle right end position of the stopped vehicle, to the reference boundary line position, and wherein the electronic control unit does not recognize the stopped vehicle as the target vehicle for the steering control when the first distance with respect to the reference boundary line position is greater than the second distance, even when the reference boundary line position sandwiched between the vehicle left end position and the vehicle right end position of the stopped vehicle is present.

2. The target vehicle recognition apparatus according to claim 1, wherein the electronic control unit detects, as the reference boundary line position, a position at which the boundary line closer to the stopped vehicle, from between the two boundary lines forming the travel lane of the host vehicle, and the reference axis intersect.

3. The target vehicle recognition apparatus according to claim 2, wherein the electronic control unit detects, as the reference boundary line position, a first reference boundary line position at which one boundary line of the two boundary lines forming the travel lane of the host vehicle and the reference axis intersect each other, and a second reference boundary line position at which the other boundary line and the reference axis intersect each other, and the electronic control unit does not recognize the stopped vehicle as the target vehicle for the steering control when a gap lateral distance between a position of the host vehicle side, from between the vehicle left end position and the vehicle right end position of the stopped vehicle, and the reference boundary line position not sandwiched between the vehicle left end position and the vehicle right end position, from between the first reference boundary line position and the second reference boundary line position, is less than a gap lateral distance threshold, even when the reference boundary line position sandwiched between the vehicle left end position and the vehicle right end position of the stopped vehicle is present.

4. A target vehicle recognition apparatus for recognizing a target vehicle to be avoided by steering control of a host vehicle, the apparatus comprising:

an electronic control unit configured to:

detect a stopped vehicle located in front of the host vehicle based on at least one of a captured image of a front camera of the host vehicle and a detection result of a front radar sensor of the host vehicle;

detect, based on a detection result of the stopped vehicle by the electronic control unit and a captured image of a front camera of the host vehicle, a reference axis extending in an image horizontal direction from a lower end of the stopped vehicle on the captured image, a vehicle left end position obtained by projecting a left end of the stopped vehicle on the reference axis on the captured image, a vehicle right end position obtained by projecting a right end of the stopped vehicle on the reference axis on the captured image, and a reference boundary line position obtained by intersecting at least one of two boundary lines forming a travel lane of the host vehicle on the captured image and the reference axis; and recognize the stopped vehicle as the target vehicle for the steering control when the reference boundary line position sandwiched between the vehicle left end position and the vehicle right end position of the stopped vehicle is present, and not recognize the stopped vehicle as the target vehicle for the steering control when the reference boundary line position sandwiched between the vehicle left end position and the vehicle right end position of the stopped vehicle is not present, wherein the electronic control unit detects, as the reference boundary line position, a first reference boundary line position at which one boundary line of the two boundary lines forming the travel lane of the host vehicle and the reference axis intersect each other, and a second reference boundary line position at which the other boundary line and the reference axis intersect each other, and the electronic control unit does not recognize the stopped vehicle as the target vehicle for the steering control when a gap lateral distance between a position of the host vehicle side, from between the vehicle left end position and the vehicle right end position of the stopped vehicle, and the reference boundary line position not sandwiched between the vehicle left end position and the vehicle right end position, from between the first reference boundary line position and the second reference boundary line position, is less than a gap lateral distance threshold, even when the reference boundary line position sandwiched between the vehicle left end position and the vehicle right end position of the stopped vehicle is present.

5. A processing method of a target vehicle recognition apparatus for recognizing a target vehicle to be avoided by steering control of a host vehicle, the method comprising:

detecting, by an electronic control unit of the target vehicle recognition apparatus, a stopped vehicle located in front of the host vehicle, based on at least one of a captured image of a front camera of the host vehicle and a detection result of a front radar sensor of the host vehicle;

detecting, by the electronic control unit of the target vehicle recognition apparatus, based on a detection result of the stopped vehicle and a captured image of a front camera of the host vehicle, a reference axis extending in an image horizontal direction from a lower end of the stopped vehicle on the captured image, a vehicle left end position obtained by projecting a left end of the stopped vehicle on the reference axis on the captured image, a vehicle right end position obtained by projecting a right end of the stopped vehicle on the reference axis on the captured image, and a reference boundary line position obtained by intersecting at least one of two boundary lines forming a travel lane of the host vehicle on the captured image and the reference axis; and recognizing, by the electronic control unit of the target vehicle recognition apparatus, the stopped vehicle as the target vehicle for the steering control when the reference boundary line position sandwiched between the vehicle left end position and the vehicle right end position of the stopped vehicle is present, and not recognizing the stopped vehicle as the target vehicle for the steering control when the reference boundary line position sandwiched between the vehicle left end position and the vehicle right end position of the stopped vehicle is not present, wherein the method further comprises:

calculating, by the electronic control unit of the target vehicle recognition apparatus, a first distance from a position on the host vehicle side, from between the vehicle left end position and the vehicle right end position of the stopped vehicle, to the reference boundary line position, and a second distance from a position on an opposite side of the host vehicle, from between the vehicle left end position and the vehicle right end position of the stopped vehicle, to the reference boundary line position, and not recognizing, by the electronic control unit of the target vehicle recognition apparatus, the stopped vehicle as the target vehicle for the steering control when the first distance with respect to the reference boundary line position is greater than the second distance, even when the reference boundary line position sandwiched between the vehicle left end position and the vehicle right end position of the stopped vehicle is present.

* * * * *